United States Patent
Moeller et al.

(10) Patent No.: US 7,156,900 B2
(45) Date of Patent: *Jan. 2, 2007

(54) ADSORBER STATION AND THE USE THEREOF

(75) Inventors: Stefan Moeller, Munich (DE); Wolfgang Bader, Ebenhausen (DE)

(73) Assignee: Linde AG, Wiesbaden (DE)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 10/493,433

(22) PCT Filed: Oct. 11, 2002

(86) PCT No.: PCT/EP02/11387

§ 371 (c)(1), (2), (4) Date: Sep. 16, 2004

(87) PCT Pub. No.: WO03/035220

PCT Pub. Date: May 1, 2003

(65) Prior Publication Data

US 2005/0016379 A1   Jan. 27, 2005

(30) Foreign Application Priority Data

Oct. 24, 2001  (DE) ............... 101 52 359
Feb. 13, 2002  (EP) ............... 02003327

(51) Int. Cl.
 *B01D 53/04*  (2006.01)
 *B01D 53/26*  (2006.01)

(52) U.S. Cl. .................. 95/118; 95/139; 96/130; 96/133; 96/144; 96/153

(58) Field of Classification Search ............ 95/96–106, 95/114, 115, 117–126, 139; 96/121–128, 96/143, 144, 130–133, 153, 154
See application file for complete search history.

(56) References Cited

U.S. PATENT DOCUMENTS

| | | | | |
|---|---|---|---|---|
| 2,699,837 A | * | 1/1955 | Van Note | 96/127 |
| 3,505,783 A | * | 4/1970 | Graham | 95/25 |
| 4,373,938 A | * | 2/1983 | McCombs | 96/114 |
| 4,509,959 A | * | 4/1985 | McCombs | 96/115 |
| 4,584,001 A | * | 4/1986 | Dechene | 96/114 |
| 4,671,925 A | * | 6/1987 | Queiser et al. | 376/310 |
| 4,711,645 A | | 12/1987 | Kumar | |
| 4,802,899 A | * | 2/1989 | Vrana et al. | 96/109 |
| 5,082,474 A | | 1/1992 | Shirley et al. | |
| 5,090,973 A | | 2/1992 | Jain | |
| 5,232,474 A | | 8/1993 | Jain | |
| 5,474,595 A | * | 12/1995 | McCombs | 95/23 |

(Continued)

FOREIGN PATENT DOCUMENTS

EP    0453202    10/1991

(Continued)

*Primary Examiner*—Robert A. Hopkins
(74) *Attorney, Agent, or Firm*—Millen, White, Zelano & Branigan, P.C.

(57) ABSTRACT

The invention relates to an adsorber station with a first adsorber (A) and a second adsorber (B). A first closed loop pipeline (1) is connected to the adsorbers (A, B) and is provided with product gas feed line valves (4A, 4B) and regeneration gas discharge line valves (6A, 6B). A second closed loop pipeline (2) that is connected to the adsorbers (A, B) has product gas discharge line valves (7A, 7B) and regeneration gas feed line valves (8A, 8B).

15 Claims, 1 Drawing Sheet

U.S. PATENT DOCUMENTS

| | | | |
|---|---|---|---|
| 5,490,871 A * | 2/1996 | Coates et al. | 95/23 |
| 5,518,526 A * | 5/1996 | Baksh et al. | 95/100 |
| 5,520,720 A * | 5/1996 | Lemcoff | 95/96 |
| 5,529,607 A * | 6/1996 | Tan | 95/12 |
| 5,551,257 A * | 9/1996 | Jain | 62/644 |
| 5,614,000 A | 3/1997 | Kalbassi et al. | |
| 5,735,938 A * | 4/1998 | Baksh et al. | 95/101 |
| 5,855,650 A | 1/1999 | Kalbassi et al. | |
| 5,871,564 A * | 2/1999 | McCombs | 95/98 |
| 5,968,233 A * | 10/1999 | Rouge et al. | 95/96 |
| 6,099,618 A * | 8/2000 | Monereau | 95/101 |
| 6,287,365 B1 * | 9/2001 | Markovs et al. | 95/96 |
| 2002/0121193 A1 * | 9/2002 | Baksh et al. | 95/96 |
| 2002/0134234 A1 * | 9/2002 | Kalbassi et al. | 95/11 |
| 2004/0055465 A1 * | 3/2004 | Guillard et al. | 95/96 |

FOREIGN PATENT DOCUMENTS

| | | |
|---|---|---|
| EP | 0475591 | 3/1992 |
| EP | 0482863 | 4/1992 |
| EP | 766989 | 4/1997 |
| FR | 2 550 466 A1 * | 2/1985 |
| JP | 63-319019 A * | 12/1988 |

* cited by examiner

Figure
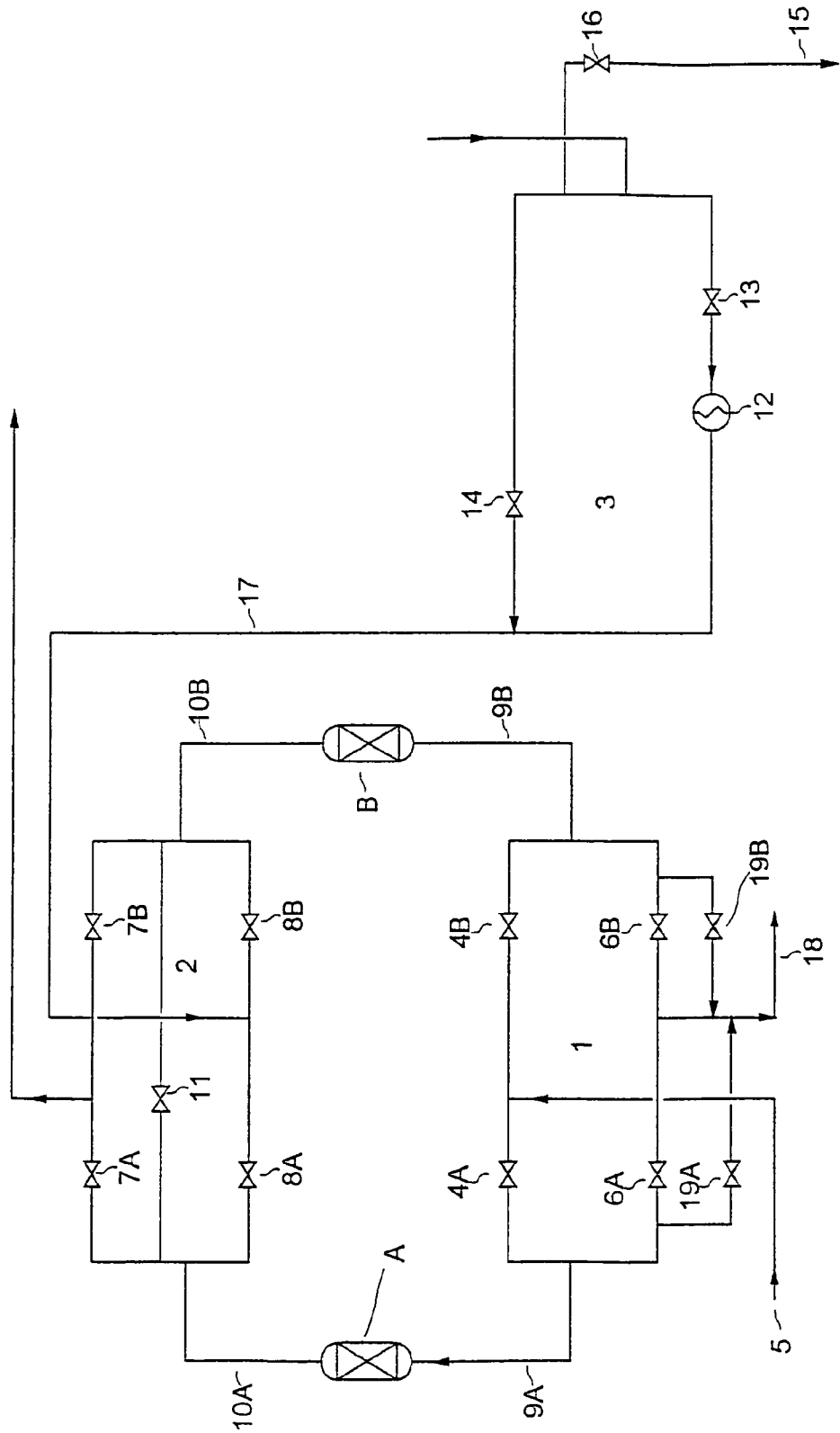

ADSORBER STATION AND THE USE THEREOF

The invention relates to an adsorber station with a first adsorber and a second adsorber, the first and the second adsorbers each having a product gas feed line that is provided with a product gas feed line valve, a product gas discharge line that is provided with a product gas discharge line valve, a regeneration gas feed line that is provided with a regeneration gas feed line valve as well as a regeneration gas discharge line that is provided with a regeneration gas discharge line valve.

Water vapor and carbon dioxide must be removed from the charging air that is supplied to a low-temperature air separation system before cooling in order to avoid deposits of solids in the low-temperature part. Generally, these components of the charging air are removed before entering the main heat exchanger by adsorption. To do this, adsorbers filled with synthetic zeolites, so-called molecular sieves, are often used.

For reliable operation of molecular sieves or adsorbers in general, it is necessary to regenerate the latter with a suitable regeneration gas from time to time. For uninterrupted operation, therefore, at least two adsorbers are required, of which one is charged with the substances that are to be removed, while the other is regenerated.

The piping of at least two adsorbers has one feed line and one discharge line for each adsorber for the product gas that is to be purified as well as one feed line and one discharge line for the regeneration gas. Moreover, in the various pipelines, corresponding valves must be arranged in order to be able to change the two adsorbers between charging operation and regeneration operation.

The size and arrangement of the adsorbers depend on numerous factors, such as for example, the amount, the temperature, and the degree of contamination of the gas that is to be processed or the climatic conditions at the installation site. In the past, all piping and the arrangement of the changeover valves had to be adapted individually to each embodiment of the adsorber unit.

The object of this invention is therefore to develop piping for the adsorber that can be used in many embodiments of the adsorbers and under the most varied boundary conditions.

This object is achieved according to the invention in that there is a first closed loop pipeline that is connected to the adsorbers and that is provided with product gas feed line valves and the regeneration gas discharge line valves and/or a second closed loop pipeline that is connected to the adsorbers and that is provided with product gas discharge line valves and the regeneration gas feed line valves.

According to the invention, the piping of the adsorbers consists of several modules, specifically closed loop pipelines, that, depending on the execution, size and arrangement of the adsorbers, are combined differently. In the first closed loop pipeline, the product gas feed line valves and the regeneration gas discharge line valves are already arranged. The first closed loop pipeline thus comprises all of the changeover valves that are necessary on the product gas feed side of the adsorbers. Accordingly, the product gas discharge line valves and the regeneration gas feed line valves are integrated into the second closed loop pipeline.

Preferably, both a first closed loop pipeline and also a second closed loop pipeline are provided. In this case, the two closed loop pipelines need be connected only to the adsorbers and the corresponding connecting lines. All of these connections can be produced by simple connecting lines, i.e., by lines that have neither fittings nor instrumentation or other attachments or internals.

The adsorbers are regenerated by means of a hot regeneration gas that is free of the substances that are to be adsorbed. Often, the gas that is used as a regeneration gas must be heated before it is fed into the adsorbers, for which the corresponding heat exchangers or heaters are used. Moreover, the adsorber must be cooled to its operating temperature after regeneration is completed in order to ensure proper operation upon subsequent charging. To do this, the temperature of the regenerated adsorber is first lowered with cold regeneration gas before the product gas that is to be purified is supplied.

In one preferred embodiment, therefore, a regeneration gas closed loop pipeline that has a regeneration gas inlet, a regeneration gas outlet and means for heating the regeneration gas is provided. To heat the regeneration gas, especially electrical heaters or steam heaters are considered. In the actual regeneration phase, the regeneration gas is routed from the regeneration gas inlet to the regeneration gas outlet via part of the regeneration gas closed loop pipeline that contains means for heating the gas. Conversely, the regeneration gas in the phase that is downstream from the regeneration, in which it is used for cooling the regenerated adsorber preferably flows through the other regeneration gas closed loop pipeline part that is used as a bypass around the heating means.

The closed loop pipelines, that is, the first closed loop pipeline, the second closed loop pipeline and the regeneration gas closed loop pipeline, are preferably made such that the latter encompass an essentially circular, oval or rectangular surface. The closed loop pipelines therefore each have a simple geometrical shape in order to keep the piping as simple as possible.

Advantageously, pipe sound absorbers are installed in the first closed loop pipeline and/or the second closed loop pipeline and/or the regeneration gas closed loop pipeline. By providing pipe sound absorbers in the closed loop pipelines, the otherwise conventional noise abatement measures, such as, for example, housings, can be abandoned. It has been shown that pipe sound absorbers, especially in combination with insulation around the closed loop pipelines, offer sufficient noise abatement. Insulation around the first closed loop pipeline and the second closed loop pipeline is, however, generally necessary anyway in order to avoid condensation water on the first closed loop pipeline and in order to insulate the second closed loop pipeline through which the warm or hot regeneration gas flows.

The piping of the adsorbers by means of the various closed loop pipelines according to the invention offers a flexible concept that can be adapted to the most varied external conditions. The entire adsorber station consists ideally of five modules, specifically the two adsorbers, the first closed loop pipeline and the second closed loop pipeline as well as the regeneration gas closed loop pipeline that contain all important components and can be arranged more or less in any arbitrary way to one another according to the modular principle. For example, closed loop pipelines of the same design can be used for adsorbers of varied size or design. Only the connections that are made only as simple connecting lines need be modified accordingly.

In an arrangement of closed loop pipelines that has proven especially favorable, the first closed loop pipeline is located underneath and/or the second is located above the first and the second adsorber. In this case, an extremely compact adsorber station is produced. Depending on the execution and arrangement of the adsorbers, for example whether vertical or horizontal, and depending on the boundary conditions, the closed loop pipelines can, however, also be located in a different relationship to one another. It is, for example, also advantageous to arrange the first closed loop pipeline underneath the adsorber and the second closed loop pipeline next to the adsorbers.

If the adsorber station is set up in an area in which very low temperatures prevail, so that it is necessary to house the closed loop pipelines for protection against the effects of weather, the closed loop pipelines are located advantageously directly next to one another or on top of one another and are housed jointly.

The invention and further details of the invention are explained in more detail below based on the embodiments shown in the drawings.

Here, the FIGURE schematically shows the piping of a molecular sieve station according to the invention.

The molecular sieve station shown in the FIGURE is used to remove carbon dioxide and water vapor from the charging air for a low-temperature air separation system. It comprises two molecular sieve adsorbers A and B that can be changed over and that are alternately charged with the substances that are to be removed or regenerated.

The piping of the molecular sieve station has a first closed loop pipeline 1, a second closed loop pipeline 2, as well as a regeneration gas closed loop pipeline 3. The first closed loop pipeline 1, as shown schematically in the FIGURE, is located underneath the adsorbers A, B that are located next to one another. The second closed loop pipeline 2 is located above the molecular sieve adsorbers A, B, while the regeneration gas closed loop pipeline 3 is suitably located directly next to the adsorbers A, B.

Two product gas feed line valves 4A and 4B are integrated into the first closed loop pipeline 1; they make it possible to open or interrupt the inflow of charging air from the air feed line 5 to the adsorbers A, B. Furthermore, the first closed loop pipeline 1 has two regeneration gas discharge line valves 6A, 6B as well as pressure reduction valves 19A, 19B.

The second closed loop pipeline 2 is accordingly provided with two product gas discharge line valves 7A, 7B as well as two regeneration gas feed line valves 8A, 8B. In addition, a bypass that bridges the two product gas discharge line valves 7A, 7B or the two regeneration gas feed line valves 8A, 8B is provided with a pressure build-up valve 11.

The regeneration gas that is supplied to the upper closed loop pipeline is first routed into the regeneration gas closed loop pipeline 3 that has a heater 12 and a valve 13 that is located downstream from it as well as a bypass that is provided with a valve 14 around the heater 12. Moreover, a line 15 that can be closed with a valve 16 is connected to the regeneration gas closed loop pipeline 3 into the atmosphere.

The entire molecular sieve station consists essentially of five components, specifically the two molecular sieve adsorbers A and B, the upper and lower closed loop pipelines 1, 2 as well as the regeneration gas closed loop pipeline 3. Preferably all of the instruments, fittings, valves and other internals that are necessary for control and adjustment of the molecular sieve station are integrated into these five components. The connection of these components under one another takes place via simple pipelines 9A, 9B, 10A, 10B, 17 that preferably do not have fittings, valves or other internals.

In the operation of the molecular sieve station, the charging air that enters via line 5 is first routed through the previously regenerated adsorber A. To do this, the product gas feed line valve 4A and the product gas discharge line valve 7A are opened, while the product gas feed line valve 4B and the product gas discharge line valve 7B are closed. The charging air thus flows only through the adsorber A that is thus charged with carbon dioxide and water vapor.

The adsorber B is regenerated in this time, i.e., the adsorbed water and the adsorbed carbon dioxide are removed from it. To do this, after the pressure is reduced via the valve 19B, dry regeneration gas is withdrawn from the low-temperature air separation system and is delivered to the regeneration gas closed loop pipeline 3. The valve 14 is closed in this stage, the valve 13 is opened, so that the regeneration gas flows via the heater 12 and is heated to roughly 100 to 200° C.

The pressure in the adsorbers A, B during the charging phase is significantly higher than in the regeneration phase. To prevent pressure surges, therefore, before the regeneration gas is fed into the adsorber B, the pressure in this adsorber B is reduced via the valve 19B by opening the line 18 and by blowing air out into the environment.

After pressure equalization is completed, the heated regeneration gas flows into the upper closed loop pipeline 2. The valves 8A, 8B, 6A and 6B are connected such that the regeneration gas is routed only through the adsorber B.

After regeneration, the adsorber B must be cooled again to the operating temperature. In the regeneration gas closed loop pipeline 3, therefore, the valve 13 is closed, and the bypass is opened with the valve 14. The cold regeneration gas from the low-temperature air separation system then flows directly into the adsorber B and brings the latter to the required operating temperature.

Before changing over the two adsorbers A, B, via the pressure build-up line 11 in the upper closed loop pipeline, the pressure in the adsorber B is slowly increased to the operating pressure in order to avoid pressure surges during changeover.

The invention claimed is:

1. An adsorber station with a first adsorber and a second adsorber, the first and the second adsorbers each having a product gas feed line that is provided with a product gas feed line valve, a product gas discharge line that is provided with a product gas discharge line valve, a regeneration gas feed line that is provided with a regeneration gas feed line valve as well as a regeneration gas discharge line that is provided with a regeneration gas discharge line valve, characterized in that there is a first closed loop pipeline (1) that is connected to the first and second adsorbers which are each provided with said product gas feed line valve and said regeneration gas discharge line valve and/or a second closed loop pipeline (2) that is connected to the first and second adsorbers which are each provided with said product gas discharge line valve and said regeneration gas feed line valve, said first closed loop pipeline (1) and the second closed loop pipeline (2) each being a module, said adsorber station further comprising a regeneration gas closed loop pipeline (3) with a regeneration gas inlet, a regeneration gas outlet and means (12) for heating a regeneration gas.

2. An adsorber station according to claim 1, wherein the first closed loop pipeline (1) and/or the second closed loop pipeline (2) and the regeneration gas closed loop pipeline (3) encompasses a circular, oval or rectangular surface.

3. An adsorber station according to claim 1, further comprising pipe sound absorbers installed in the first closed loop pipeline (1) and/or the second closed loop pipeline (2) and/or the regeneration gas closed loop pipeline (3).

4. An adsorber station according to claim 1, wherein the first closed loop pipeline (1) is located below the first and second adsorbers and/or the second closed loop pipeline (2) is located above the first and the second adsorbers (A, B).

5. An adsorber station according to claim 1, wherein the first closed loop pipeline and the second closed loop pipeline (1, 2) are located next to one another or above one another next to the first and second adsorbers.

6. Adsorber station according to claim 1, wherein the first closed loop pipeline (1) is arranged below the first and second adsorbers and the second closed loop pipeline (2) is located next to the first and second adsorbers.

7. An adsorber station according to claim 1, comprising connecting pipelines that connect the closed loop pipelines (1, 2, 3) said connecting pipelines being devoid of fittings or instrumentation.

8. An adsorber station according to claim 1, wherein the first and the second adsorbers (A, B) are molecular sieve adsorbers.

9. In a process comprising removal of water and carbon dioxide from charging air in a low-temperature air separation system, the improvement comprising passing the charging air into an adsorber station according to claim 1.

10. An adsorber station according to claim 2, further comprising pipe sound absorbers installed in the first closed loop pipeline (1) and/or the second closed loop pipeline (2) and/or the regeneration gas closed loop pipeline (3).

11. An adsorber station according to claim 2, comprising connecting pipelines that connect the closed loop pipelines (1, 2, 3), said connecting pipelines being devoid of fittings or instrumentation.

12. An adsorber station according to claim 3, comprising connecting pipelines that connect the closed loop pipelines (1, 2, 3), said connecting pipelines being devoid of fittings or instrumentation.

13. An adsorber station according to claim 10, comprising connecting pipelines that connect the closed loop pipelines (1, 2, 3), said connecting pipelines being devoid of fittings or instrumentation.

14. An adsorber station with a first adsorber and a second adsorber, the first and the second adsorbers each having a product gas feed line that is provided with a product gas feed line valve, a product gas discharge line that is provided with a product gas discharge line valve, a regeneration gas feed line that is provided with a regeneration gas feed line valve as well as a regeneration gas discharge line that is provided with a regeneration gas discharge line valve, characterized in that there is a first closed loop pipeline (1) that is connected to the first and second adsorbers which are each provided with said product gas feed line valve and said regeneration gas discharge line valve and/or a second closed loop pipeline (2) that is connected to the first and second adsorbers which are each provided with said product gas discharge line valve and said regeneration gas feed line valve, said first closed loop pipeline (1) and the second closed loop pipeline (2) each being a module, wherein the first closed loop pipeline (1) in each case has one bypass that is provided with a pressure reduction valve (19A, 19B) and that bridges the regeneration gas discharge line valves.

15. An adsorber station with a first adsorber and a second adsorber, the first and the second adsorbers each having a product gas feed line that is provided with a product gas feed line valve, a product gas discharge line that is provided with a product gas discharge line valve, a regeneration gas feed line that is provided with a regeneration gas feed line valve as well as a regeneration gas discharge line that is provided with a regeneration gas discharge line valve, characterized in that there is a first closed loop pipeline (1) that is connected to the first and second adsorbers which are each provided with said product gas feed line valve and said regeneration gas discharge line valve and/or a second closed loop pipeline (2) that is connected to the first and second adsorbers which are each provided with said product gas discharge line valve and said regeneration gas feed line valve, said first closed loop pipeline (1) and the second closed loop pipeline (2) each being a module, wherein the second closed loop pipeline (2) has one bypass that bridges the product gas discharge line valve associated with the first adsorber with the product gas discharge line valve associated with the second adsorber, said bypass being provided with a pressure build-up valve (11).

\* \* \* \* \*